(12) United States Patent
Molla

(10) Patent No.: US 10,133,362 B2
(45) Date of Patent: Nov. 20, 2018

(54) ETHIOPIC COMPUTER AND VIRTUAL KEYBOARDS

(71) Applicant: Aberra Molla, Brighton, CO (US)

(72) Inventor: Aberra Molla, Brighton, CO (US)

( * ) Notice: Subject to any disclaimer, the term of this patent is extended or adjusted under 35 U.S.C. 154(b) by 0 days.

(21) Appl. No.: 15/394,230

(22) Filed: Dec. 29, 2016

(65) Prior Publication Data

US 2017/0185164 A1    Jun. 29, 2017

Related U.S. Application Data

(60) Provisional application No. 62/272,665, filed on Dec. 29, 2015.

(51) Int. Cl.
| G06F 3/023 | (2006.01) |
| G06F 3/0488 | (2013.01) |
| G06F 3/0489 | (2013.01) |
| G06F 3/02 | (2006.01) |

(52) U.S. Cl.
CPC .......... *G06F 3/0235* (2013.01); *G06F 3/0219* (2013.01); *G06F 3/0238* (2013.01); *G06F 3/0489* (2013.01); *G06F 3/04886* (2013.01)

(58) Field of Classification Search
CPC ....................................................... G06F 3/0235
USPC .......................................................... 345/171
See application file for complete search history.

(56) References Cited

U.S. PATENT DOCUMENTS

| 6,054,941 | A | * | 4/2000 | Chen | ........................ | G06F 3/018 |
| | | | | | | 341/22 |
| 6,765,556 | B2 | * | 7/2004 | Kandogan | ............. | G06F 3/0233 |
| | | | | | | 341/22 |
| 2004/0075648 | A1 | * | 4/2004 | Koch | ..................... | G06F 3/0219 |
| | | | | | | 345/168 |
| 2009/0179778 | A1 | * | 7/2009 | Molla | ..................... | G06F 3/018 |
| | | | | | | 341/22 |
| 2010/0107906 | A1 | * | 5/2010 | Johnson | ............. | G03G 15/0894 |
| | | | | | | 101/26 |

* cited by examiner

*Primary Examiner* — Jason C Olson

(57) ABSTRACT

The present invention relates to a method to type a phonetic language without the use of a timer. The present invention also relates to keyboards associated with typing a phonetic language where the number of characters for the language exceed the number of keys possible on a keyboard.

11 Claims, 10 Drawing Sheets

ETHIOPIC COMPUTER AND VIRTUAL KEYBOARDS

CROSS REFERENCE TO RELATED APPLICATIONS

This application claims priority and the benefit under 35 U.S.C. § 119(e) to U.S. Provisional Patent Application Ser. No. 62/272,665 filed Dec. 29, 2015, which is incorporated herein in its entirety by reference.

FIELD OF THE INVENTION

The present invention relates to a method to type a phonetic language without the use of a timer. The present invention also relates to keyboards associated with typing a phonetic language where the number of characters for the language exceed the number of keys possible on a keyboard.

BACKGROUND

The rendering of Ethiopic character with a keystroke each and the use of two or more keystrokes to generate another glyph has been a problem until solved as described in U.S. Pat. No. 9,000,957 to Molla, which is incorporated by reference in its entirety. The solution involved the use of a timeout to render a glyph from two keystrokes or allow the rendering of a glyph by allowing the timeout to expire. Thus, the rendering of a glyph from one or two keystrokes is dependent on time. If a key is struck and the determined timeout allowed to expire, the solitary glyph is settled. If the first keystroke is followed by a second keystroke with a vowel within the timeout the first glyph is removed and a third glyph is rendered. If the second keystroke was struck outside the timeout two independent default glyphs of the keys are rendered. Any key can function as a modifier though the vowel, symbols and number keys were used as modifiers. The same principle applies when the shift key is utilized along with the default key to generate the initial glyph. In this ABSHA system, the rendered glyph required the expiration of the time to settle.

The present invention improves on the method set forth in Molla.

SUMMARY

The invention relates to methods to render and settle glyph keys of a phonetic language, such as the Ethiopic alphabet, with a keystroke. The method can be used on computers and virtual keyboards without a timer. The vowel forms of the Ethiopic characters are rendered with two keystrokes each using the Ethiopic and Arabic numeral rows or other keys such as vowels and symbols. The utilization of a base ten Ethiopic numeral system from the same keyboard is introduced. Timeout is not needed, though it can be used optionally. A simple method of rendering accented Latin alphabets and glyphs in the extended ASCII positions with no more than two keystrokes each is also described.

The present invention relates to a method to render and settle phonetic characters without a timer. A characteristic of the invention is two keystrokes to render a character typed without the need for a timer. In other words, the character is rendered outside a timeout that can manually be typed without getting too close to zero time. This is because the typist can't type two glyphs as the timeout approaches zero defeating the purpose. The timeout regresses or becomes ineffective as it approaches zero time and this is known as regressive timeout. With regressive timeout, one or two glyphs may also appear and settle as a result of two keystrokes. The present invention allows for the typing of a default glyph with a keystroke or its vowel form with two keystrokes. The 37 or so default glyphs are rendered with a keystroke each while the rest are rendered with two keystrokes each. Ethiopic and Arabic numeral rows as well as the vowels and symbol keys can be used as vowels.

The computer as well as the smartphone system was invented such that a keystroke renders a glyph as in the typing of "t" with "t". Striking or typing an "o" next to the "t" renders an "o" such that "to" is rendered. The Ethiopic system requires unique use of the keyboard such that the system allows the generation of a new third glyph from the "to" combination to accommodate the large Ethiopic character set. The basic principle, in its simplest form, is the assignment of the keys for use as vowels or consonants only. The novel system is a breakthrough and also a panacea that also eliminates the use of undocumented Ethiopic by others.

The invention eliminates the need to use English spelling methods to render glyphs with more than two keystrokes each. A character typed and rendered with one keystroke cannot maintain itself (i.e. be settled) and then be changed with another keystroke to another character. The present invention allowed the rendering of default glyph with one keystroke and the power to change the glyph with a vowel or another modifying keystroke.

BRIEF DESCRIPTION OF THE FIGURES

Figures 5, 6, 7, 8, 9:
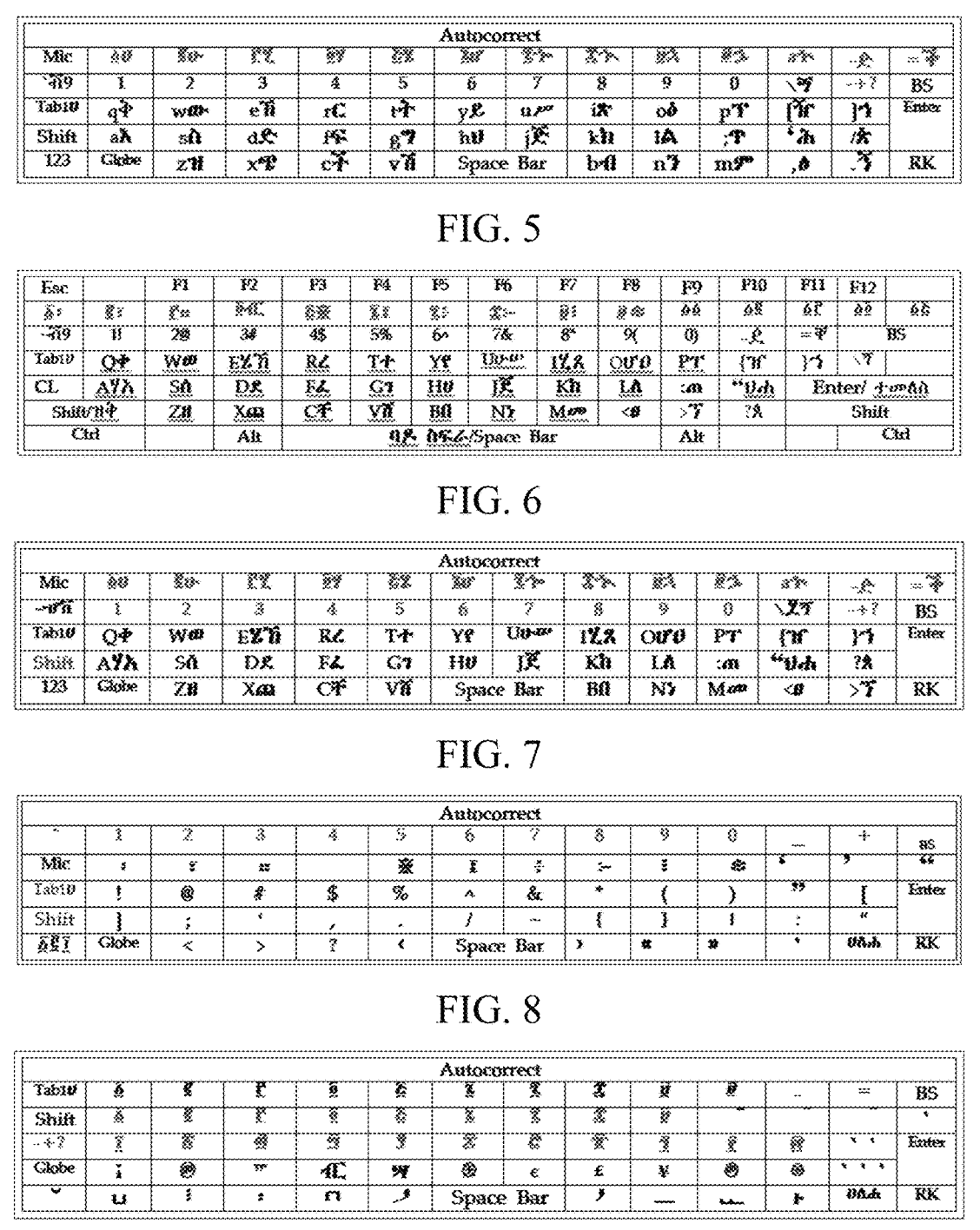

FIG. 5 illustrates a default Virtual QWERTY Ethiopic Keyboard showing the vowels with numbers;

FIG. 6 illustrates an Ethiopic keyboard 14 keys with shifted desktop and/or virtual QWERTY;

FIG. 7 illustrates shifted glyphs rendered by tapping the shift button only;

FIG. 8 illustrates an Ethiopic keyboard 14 keys shift 2 ("123" button) which allows the rendering of the numbers;

FIG. 9 illustrates an Ethiopic keyboard 14 keys shift 3 ("፩፪፫" button) which allows the rendering of the Ethiopic numeric and alphabetic numbers;

Figures 10, 11, 12, 13:
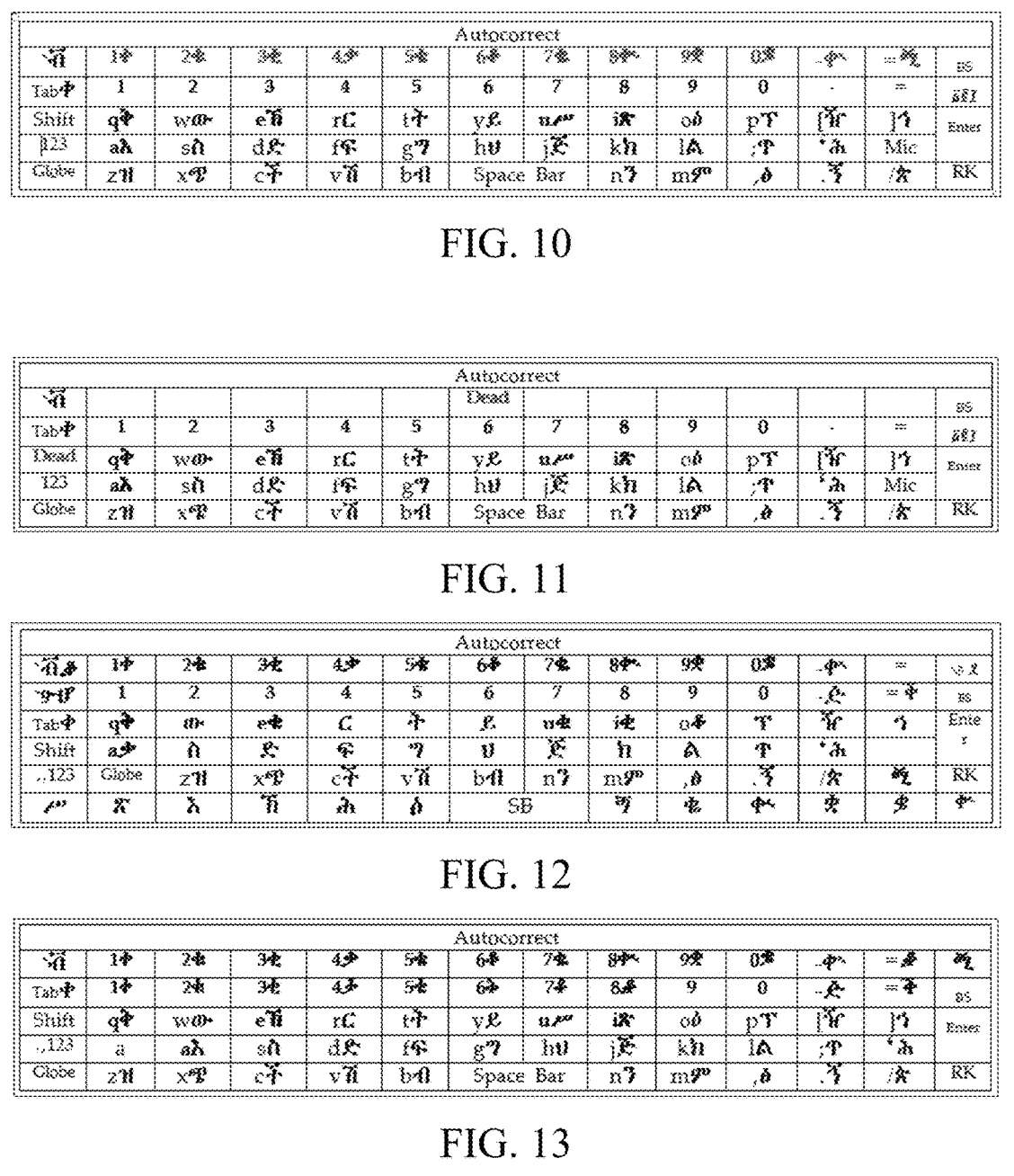

FIG. 10 illustrates an Amharic keyboard 14 keys showing one set of 12 vowel keys;

FIG. 11 illustrates an Amharic keyboard showing sets of vowel and dead keys;

FIG. 12 illustrates an Ethiopic keyboard 14 keys default vowelled 6 rows;

FIG. 13 illustrates numeral typing examples with Guragie set;

Figures 14, 15, 16, 17:
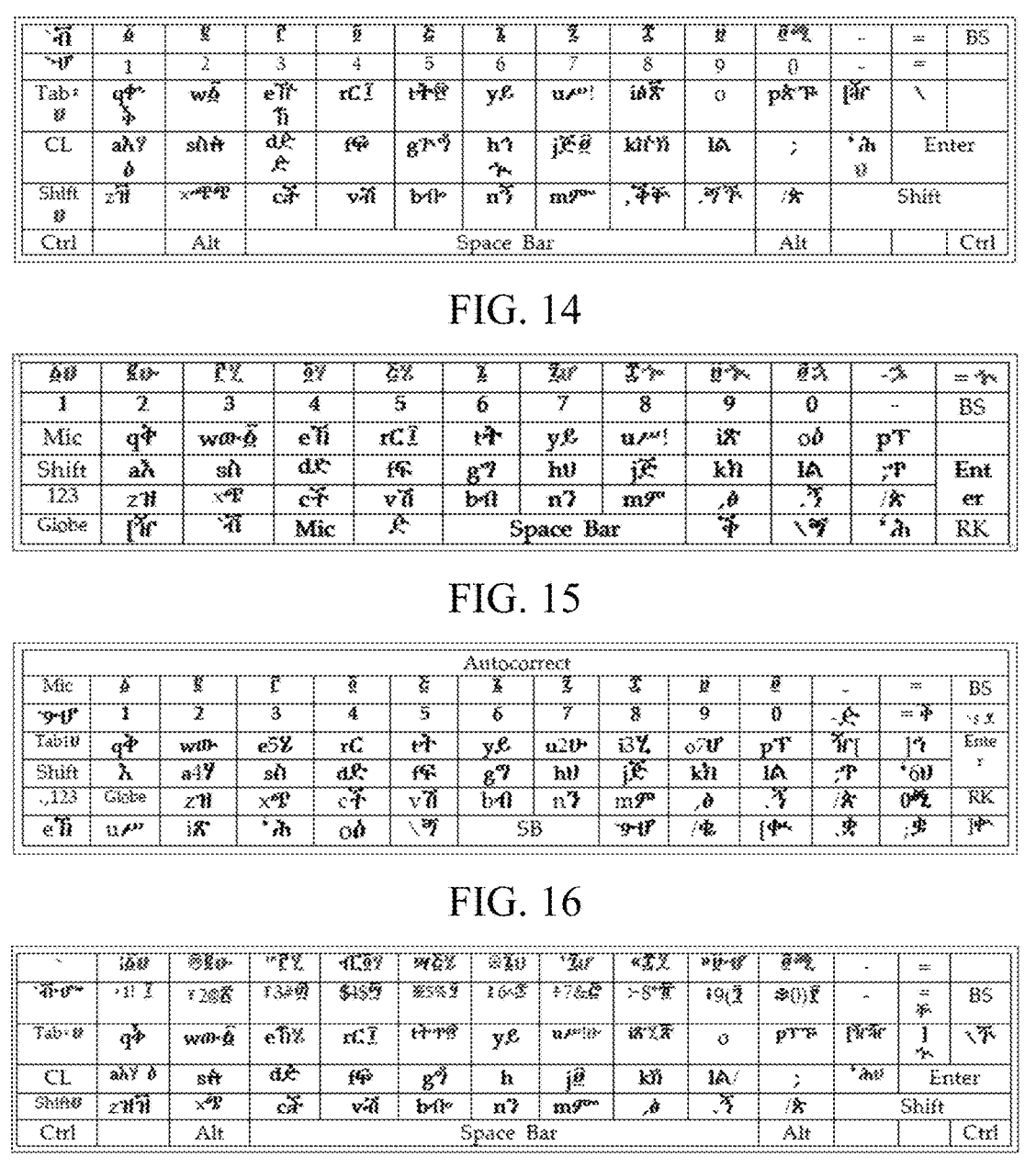

FIG. 14 illustrates Ethiopic hardware example showing sharing of keys;

FIG. 15 illustrates an Ethiopic 12 keys keyboard;

FIG. 16 illustrates an Ethiopic 14 keys keyboard with 6 rows;

FIG. 17 illustrates shared Ethiopic keys;

FIG. 18 illustrates the hardware of an Ethiopic standard keyboard;

FIG. 19 illustrates a default Ethiopic 12-key keyboard;

FIG. 20 illustrates a default Ethiopic keyboard with 11 keys;

FIG. 21 illustrates a default Ethiopic keyboard with 12 keys;

FIG. 22 illustrates an Ethiopic shifted keyboard;

Figures 23, 24, 25:
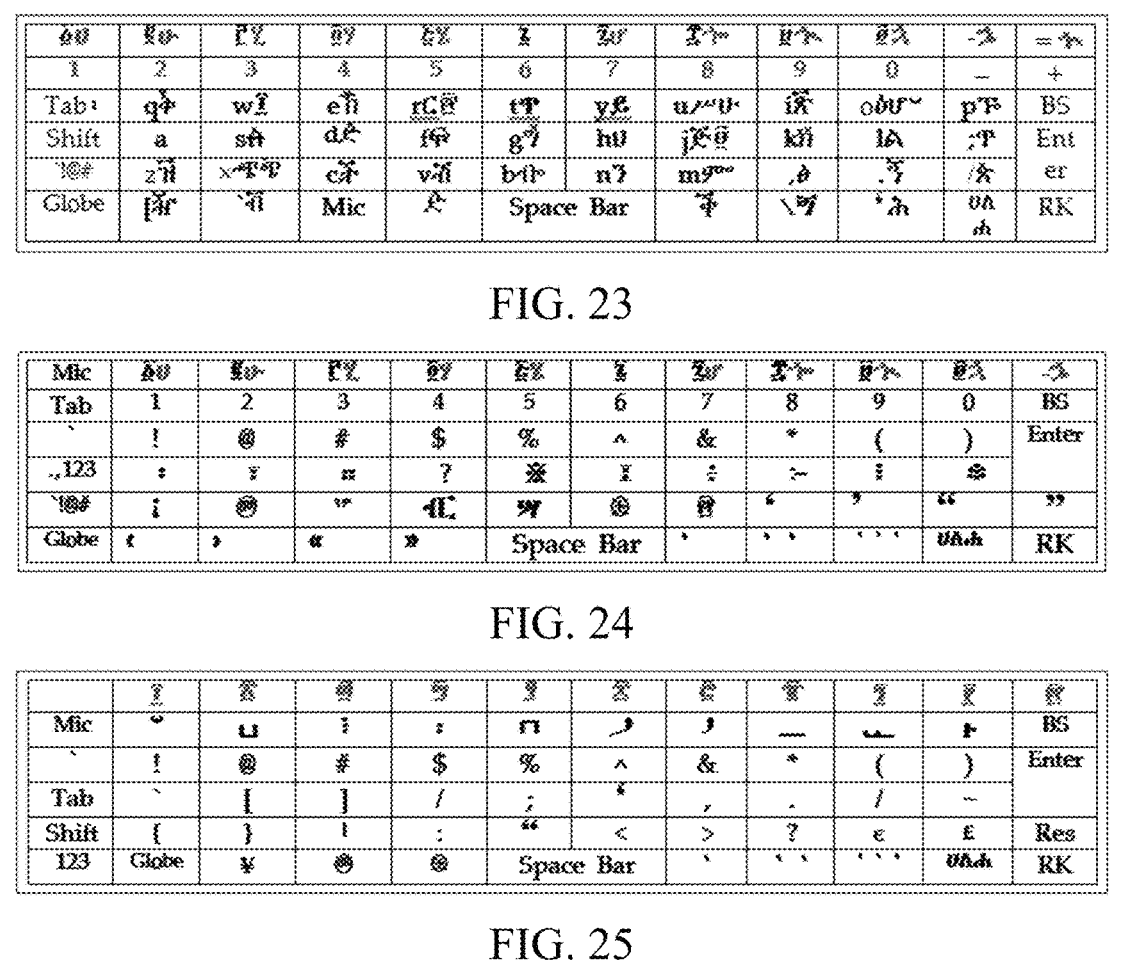

FIG. 23 illustrates a default Ethiopic keyboard with 12 keys showing key sharing;

FIG. 24 illustrates an Ethiopic keyboard with 12 keys shift 2;

FIG. 25 illustrates an Ethiopic keyboard 12 keys Shift 3;

Figures 27, 28, 29, 30:
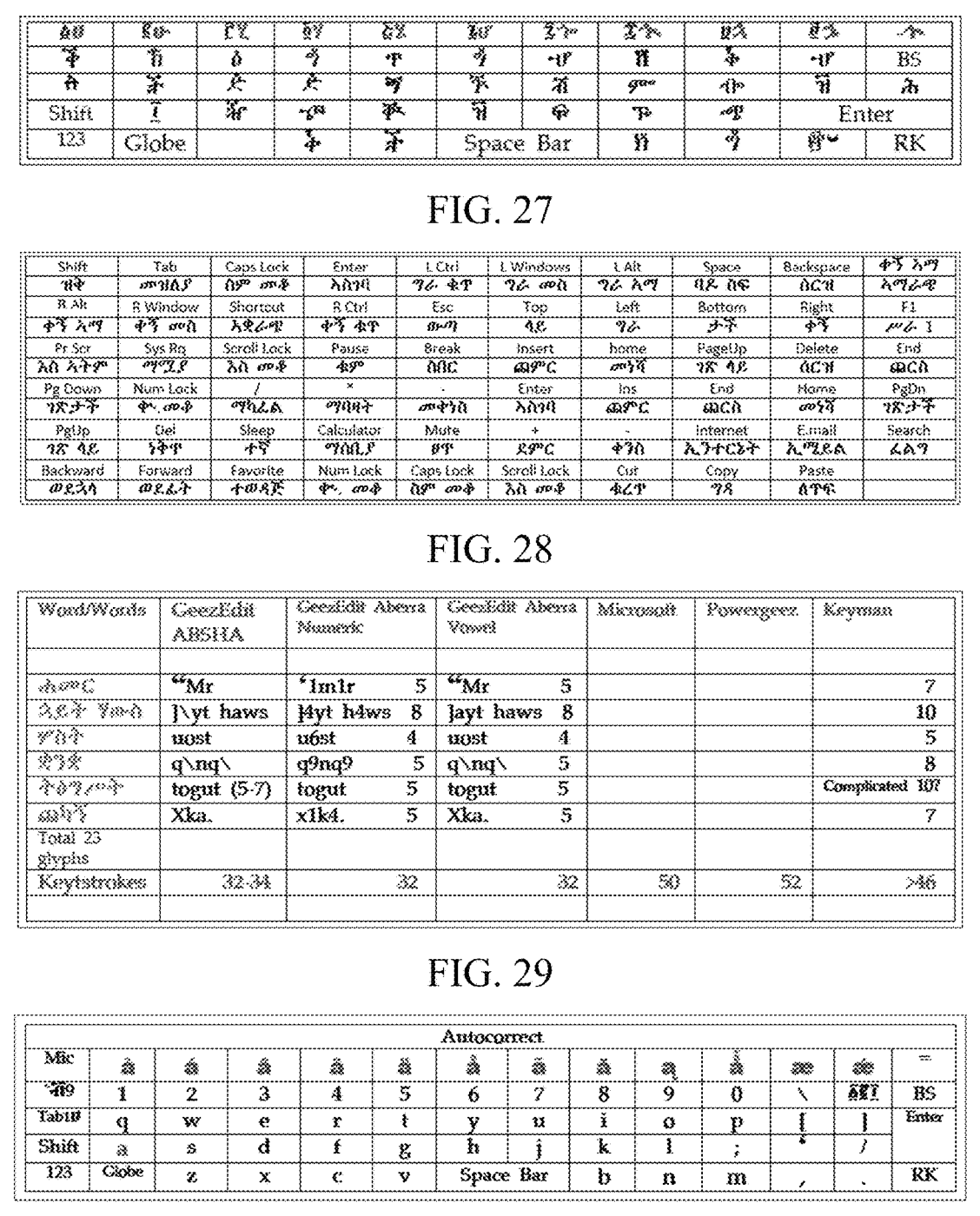

FIG. 27 illustrates glyphs available from the shift to render their vowel forms;

FIG. 28 illustrates example key names;

FIG. 29 illustrates keystrokes comparison showing a system rendering the 23 glyphs with 32 keystrokes;

FIG. 30 illustrates the Latin capital accents accessible from the shift, another row or page;

Figures 31, 32, 33:
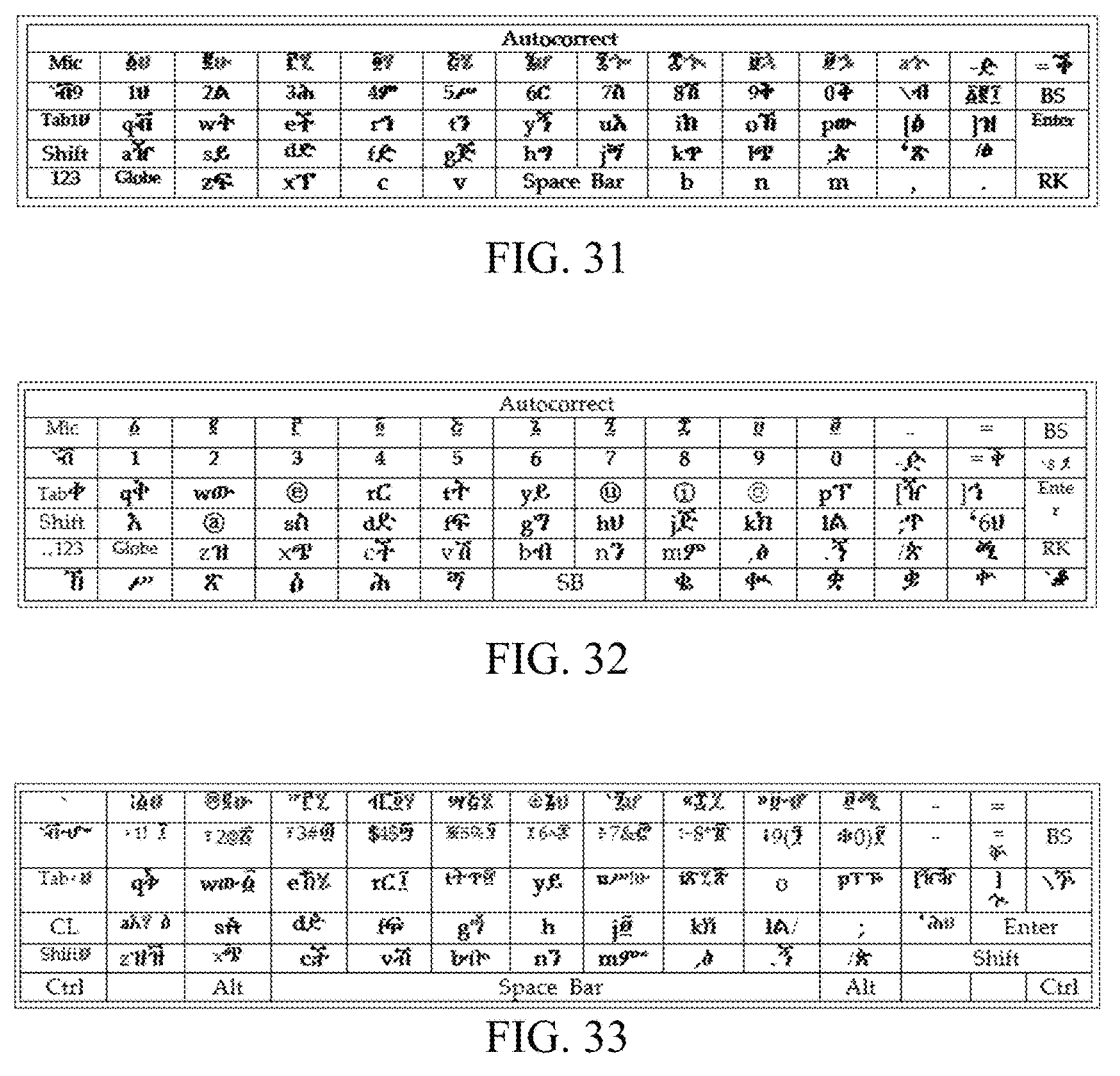

FIG. 31 illustrates Ethiopic heleheme sorting order example;

FIG. 32 illustrates an example keyboard with dedicated Ethiopic vowels; and

FIG. 33 illustrates a desktop keyboard.

FIG. 34 illustrates a table of example keystrokes in a first embodiment

FIG. 35 illustrates a table of example keystrokes in a second embodiment.

DETAILED DESCRIPTION

Figures 1, 2, 3, 4:
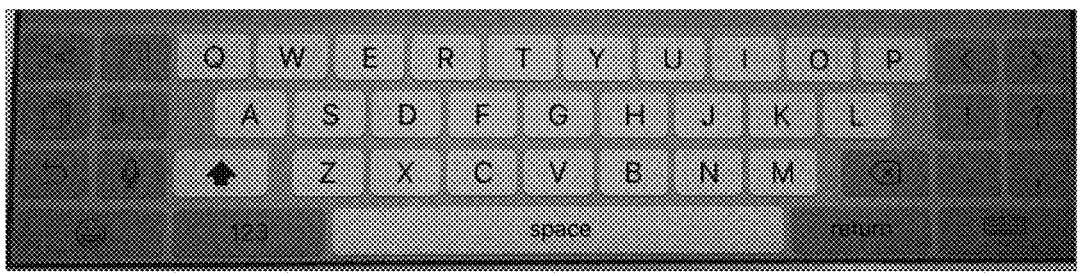
FIG. 1 illustrates a layout of the Ethiopic computer hardware or virtual keyboard.
FIG. 2 illustrates fourteen keys per row in iPhone® 6S.
FIG. 3 illustrates a default Ethiopic iPhone® 6 keyboard.
FIG. 4 illustrates a default Virtual QWERTY Ethiopic Keyboard showing the vowels with numbers.

The present invention allows for a numeric keyboard to switch between vowels and addition of a new row similar to the function keys or even the function keys as vowels while retaining the 37 alpha symbolic keys as consonants. It is also possible to use any key (including function key) as a vowel or consonant as far as it is not used as a vowel and consonant. This principle applies to the utilization of a default or shifted default keys. This feature is shared by other keys on the computer such as "tab" as well as other keys that can be added to the keyboard, e.g. a second "a" key. Timeout became an option instead of a necessity with the present invention and a base ten Ethiopic numerals can also be introduced. Depending on the keyboard the default numbers could change from what is available by introduction of more or less keys as well as adding keyboards to more shifted positions.

The present invention increases efficiency to the previous methods such that Ethiopic can be rendered with one and two keystrokes without the need for a timeout. This method can also optionally use a different timeout also known as progressive timeout. The invention enforces the basic principle that Ethiopic can be rendered from a single keyboard (even without the shift key involvement for example on device keyboards) with one and two keystrokes.

The present invention also has new embodiments. With the previous method (Molla), the 37 keys or 47 keys were used as vowels and consonants. In other words, the vowel keys were utilized as default keys and also as vowels. In the present invention utilizes the numeric key row glyphs as dedicated vowels. The number of keys in the numeric rows depends on the desktop keyboard, or the device keyboard (aka virtual keyboard). The present invention can also apply to abbreviated or shifted keyboards.

Another embodiment that enhanced this method is the programming that allowed the rendering and settlement of the default glyphs with one keystroke each and at zero time or without a timer. The default glyphs are rendered and settled at zero time. The rendering of the 37 default Ethiopic glyphs with one keystroke each is a prerequisite for the system to work. The vowel forms of the defaults were rendered with the numbers as second keystrokes. Since the defaults were rendered with a keystroke each, there is no need for a second keystroke or a settling key. As an example, the Amharic "k" series has seven primary and five secondary varieties. The sixth form can be rendered by the default, or with a modifier keystroke, such as the "tab" and/or "shift". Furthermore, it is the numeric row rather than the numbers that are assigned to the vowel functions. Thus "k1", "k2", "k3", "k4", "k5", "k6", "k7", "k8", "k9", "k0" and "k-" can be used to render "ህ", "ሁ", "ሂ", "ሃ", "ሄ", "ህ", "ሆ", "ሗ", "ኋ", "ኋ", and "ሗ" respectively. The "ህ" can also be rendered with "Shift k" or "k Tab" optionally. (To avoid confusion the default "ህ" rendered with "k" can also be rendered with "k6" and "k=" added to accommodate the displacement.) Thus, unlike the Molla method, which requires the use of a timer because the modifier keystroke can also be itself a first keystroke, the present invention utilizes modifier keystrokes that are not used to render characters as default characters. Thus, a timer is not required.

Another embodiment that enhanced the method is the addition of another numeric row. Actually, the use of more vowel rows (6) is efficient compared to the consonant rows (10) presented in the previous continuation application. This row as an empty or Ethiopic numeral row can be used as vowels especially for Ethiopic use. In its simplest form, Geez needs 22 vowel forms and thus two rows of such keys are enough. Only one numeral row is needed in smaller character sets such as Amharic.

Another embodiment that enhanced the method is the utilization of the ten Ethiopic numerals as digits just like the Arabic numerals. The Ethiopic numbers one to nine along with the zero were used. The Ethiopic numeral keyboard is an example of a novel keyboarding method to render Ethiopic with one and two keystrokes without the need for a timeout. The numeric glyphs used as vowels come in two rows whereby a first row is a working Ethiopic numbers ፩፪፫፬፭፮፯፰፱፻ ° (1234567890) with a working zero digit. In the hardware version of the computer, a row of Ethiopic digits and some more keys are added between the digits and the function keys and the renamed commands make them Amharic and Ethiopic. The Ethiopic digits share the base 10 mathematical features of the Arabic numerals from a common single keyboard and both number systems are rendered from a default or its shifted keyboard. For the first time, the Ethiopic and the English digits are typed from the same keyboard and from two fonts or typefaces without the need to manually change the typefaces. (The Function keys can be used as an optional Ethiopic or Arabic numerals.)

The 37 6$^{th}$ order default keys of the Ethiopic are typed with one keystroke each. More keys have been introduced where 37 were not sufficient. The vowel forms of the Amharic are typed with the Ethiopic digits while Ethiopic also utilizes the Arabic numerals. The 37 can also be expanded to the 47 keys if the Ethiopic numerals or shifted keyboards are utilized. This is accomplished because the first keystrokes render and settle the default while the vowel forms or orders utilize different keys with or without a timeout. The uniqueness of the novel method is because the rendered glyphs are settled just like the English alphabet.

It is also possible to utilize the system in variety of modifications. For instance, the Ethiopic numeral row can be used as vowels for Amharic and free up the Arabic numerals to render the numbers with a keystroke each increasing the defaults to 47.

A novel method that allowed the use of functional Ethiopic numerals is the power to render the Ethiopic numerals along with the Arabic numerals from the same keyboard. This is done by specifying the font name along with the key sequence codes. For instance, the ten Ethiopic numbers are typed from the ASCII positions of GeezEdit0 font. The Arabic numerals are also typed from the ASCII positions of GeezEdit Unicode font. Both the Arabic and Ethiopic zero numbers are rendered from the 048 code points. The individual numbers of both types can be settled with any key optionally and the system works with or without a timeout and is not dependent on the timeout.

The system allows varieties of modifications and minor changes and assignments without deviating from the invention. For instance, the Ethiopic and Arabic numerals can be moved to the shifted positions of the desktop or virtual keyboards and the Ethiopic rendered with rows of blank keys as vowels. In another embodiment, the Ethiopic glyphs assigned to the vowel and symbol keys can be moved up or elsewhere and the dedicated vowel activities returned to the vowel keys so that the system work the vowels in their usual positions. In this example "ከ", "ኩ", "ኪ", "ካ", "ኬ", "ክ", "ኮ", "ኳ", "ዀ", and "ኸ" could be rendered with "K", "ku", "ki", "ka", "ke", "ko", "k/", "k[", "k.", "k;" and "k]" respectively. "h" can also be rendered with "k Tab" while "k" renders the default "ከ". In this case the Ethiopic assigned to the vowel keys can be moved to additional new keys.

The breakthrough of the invention is separation the keys into vowels and consonants. However, vowel keys can also function as consonants for other vowel keys. This is enhanced by rendering the glyphs at zero time and the addition of a working Ethiopic numeral row.

Currently accented English alphabet vowels are rendered by holding down the key and when the vowels appear, the user scoots to the wanted variety and releases the button. These long hold methods are cumbersome and waste time. The new invention allows the utilization of only two keystrokes to render the Latin alphabet accents. For instance, the accented forms of the "a" appear on keys to be picked up with a second keystroke making typing simple and fast. Even in the hardware versions the novel method reduces the keystroke to two.

In another embodiment, a rendered glyph can also be changed to its vowel form using the scooting method by sliding to one of the vowel forms that appear at zero time. The scooting method can work for rendering an Ethiopic character with or without a timer.

Another embodiment of the present invention is the optional use of utilizing a settling keystroke to render the default. Another embodiment utilizes multiple keystrokes to render a character. By way of example, it is possible to render "ሸ" with "she", "S", "Se", "s Tab", "S Tab", "S1", "Caps Lock s" etc.

In another embodiment, the Ethiopic or English numeral key rows act as dead keys or nothing happens on first keystroke. The numerals show up on double striking them or when second keystrokes by others are used on them. This is because they are vowels to the 37, 47 or more keys. Eliminating the Ethiopic numerals and moving this feature to the Arabic numerals rows for smaller sets such as Amharic and Geez language is also possible. This feature is shared by the hardware as well as virtual keyboards in computers and others such as cellphones, iPad, etc. An example where the glyphs are not shown is FIG. 11. These dead keys or the number "1̄" only can be used as second keystrokes after the default, if necessary. The purpose is to eliminate the imposition of not using the numbers since they otherwise generate the vowel forms of the defaults that precede them.

Figures 18, 19, 20, 21, 22:
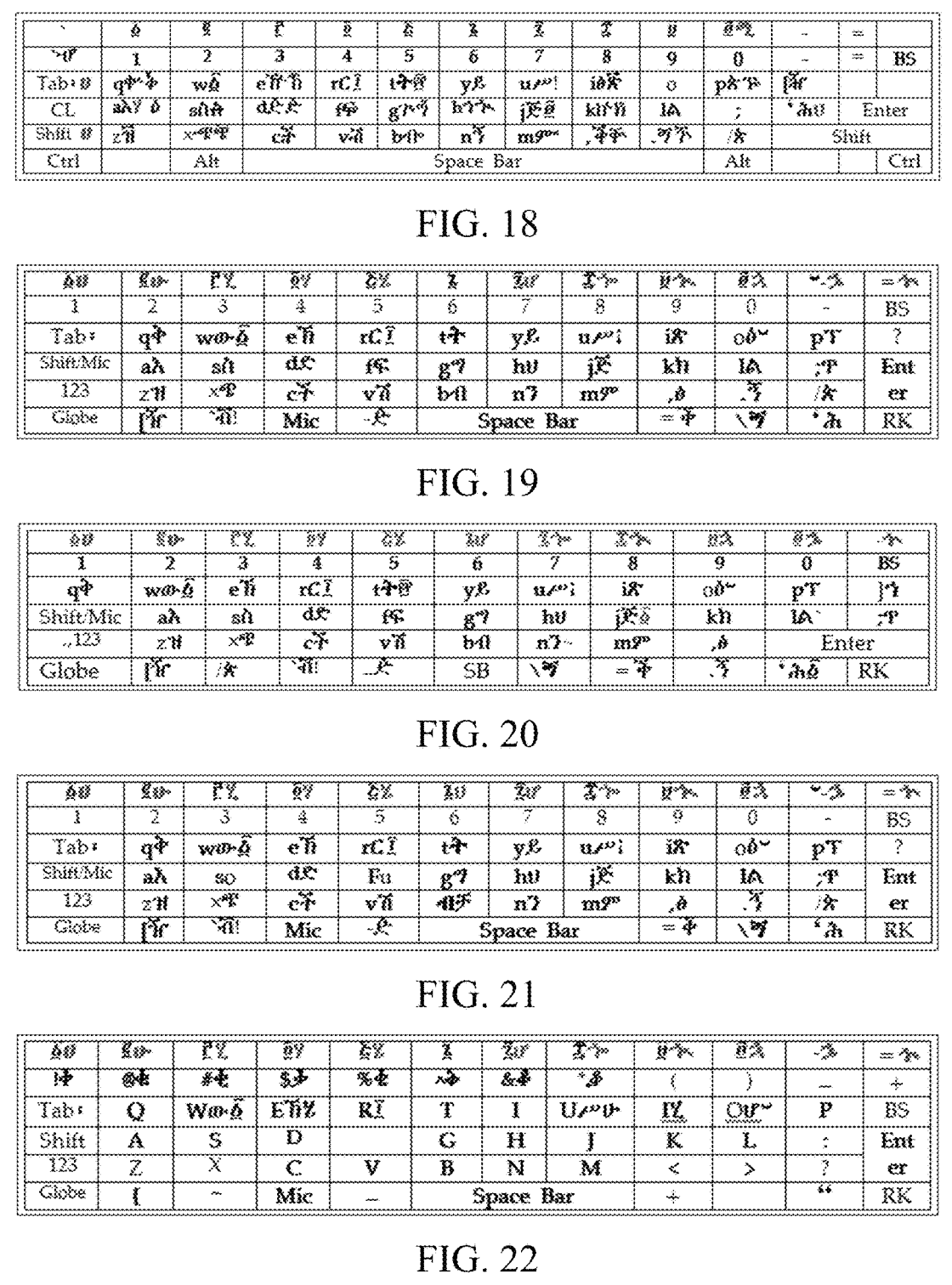

The layouts were governed by the type of languages supported as well as the number of keys available in a row and column. In general, as the numbers of keys in a row are reduced, the system requires more shifts. Currently popular smart phones can accommodate 11 to 14 keys in a row. The Ethiopic can also be rendered from a single keyboard to 4 shifted keyboards for use in various embodiments. Representative layouts are presented. In iPad and tablets the keyboard can handle the full QWERTY keyboards with little or no changes other than the numeric rows where necessary and the Mic could be given its own key. (FIGS. 20 and 21)

It should be understood that the glyph series distributed on numerous grid such as 10 by 10 can also be distributed on shifts. The present invention requires more keys as compared to the method set forth in Molla because the present invention does not require a timer. Both systems can optionally take advantage of the shifted keyboards to simplify keystrokes at the expense of introducing more keystrokes.

The Shift key allows the typing of $1^{st}$ order glyphs and this function can be performed with the Tab key as second keystrokes. The shifted keys can be locked, or can return to the lower case alphabet, or default keyboard. The "numbers on the keyboard can be present in an embodiment as can the symbols. Another embodiment is the presence of two of the three buttons on any of the pages so that the users move directly to any of the pages with a keystroke. It is possible to use the virtual system without the Shift key. The keyboard can be improved by assigning one order to use the Tab or shift key only.

The scientific principles behind the use of the keys in Ethiopic and English virtual keyboards are similar in that the most important glyphs are rendered from the default keyboard. Another keyboard is accessed through the arrowed Shift key. Unlike the English that goes to a second Shift key for the numbers, the digits are rendered from the default keyboard. The vowel forms are rendered from the default keyboard so that three and more keystrokes are avoided. If the user is interested in going to the $3^{rd}$ or $4^{th}$ keyboard only one keystroke could be required. Once on any one of the three keyboards the needed glyph is rendered with a keystroke. It is possible to go back to the default after rendering the choice without further keystrokes. This is similar to the striking the arrowed Shift where the glyph is rendered and the keyboard returns to the default after rendering the glyph. The user can also access the non-shifted keyboards from a single key on the default by single or double strikes to go to the $3^{rd}$ or $4^{th}$ keyboards. (Double keystrokes could also be put to use to combine activities such as "Remove Keyboard" and the "Backspace" keys. Taking the "Backspace" key away another row gives the vowels the 22 maximum keys or just adds an extra space to the "Space Bar" button. It is also possible to go to one of the other keyboards with another keystroke of the buttons though that defeats the purposes of returning to the default after rendering a glyph from the non-default keyboards. However, the availability of the $3^{rd}$ and $4^{th}$ keyboards is an option as the glyphs are available from the default keyboard in both systems.

The following figures are provided as exemplary, and are not intended to be the sole form of a particular keyboard. Rather, the figures are intended to provide illustrations of different embodiments of the invention. FIG. 1 illustrates an Ethiopic computer hardware keyboard.

Figure 26:
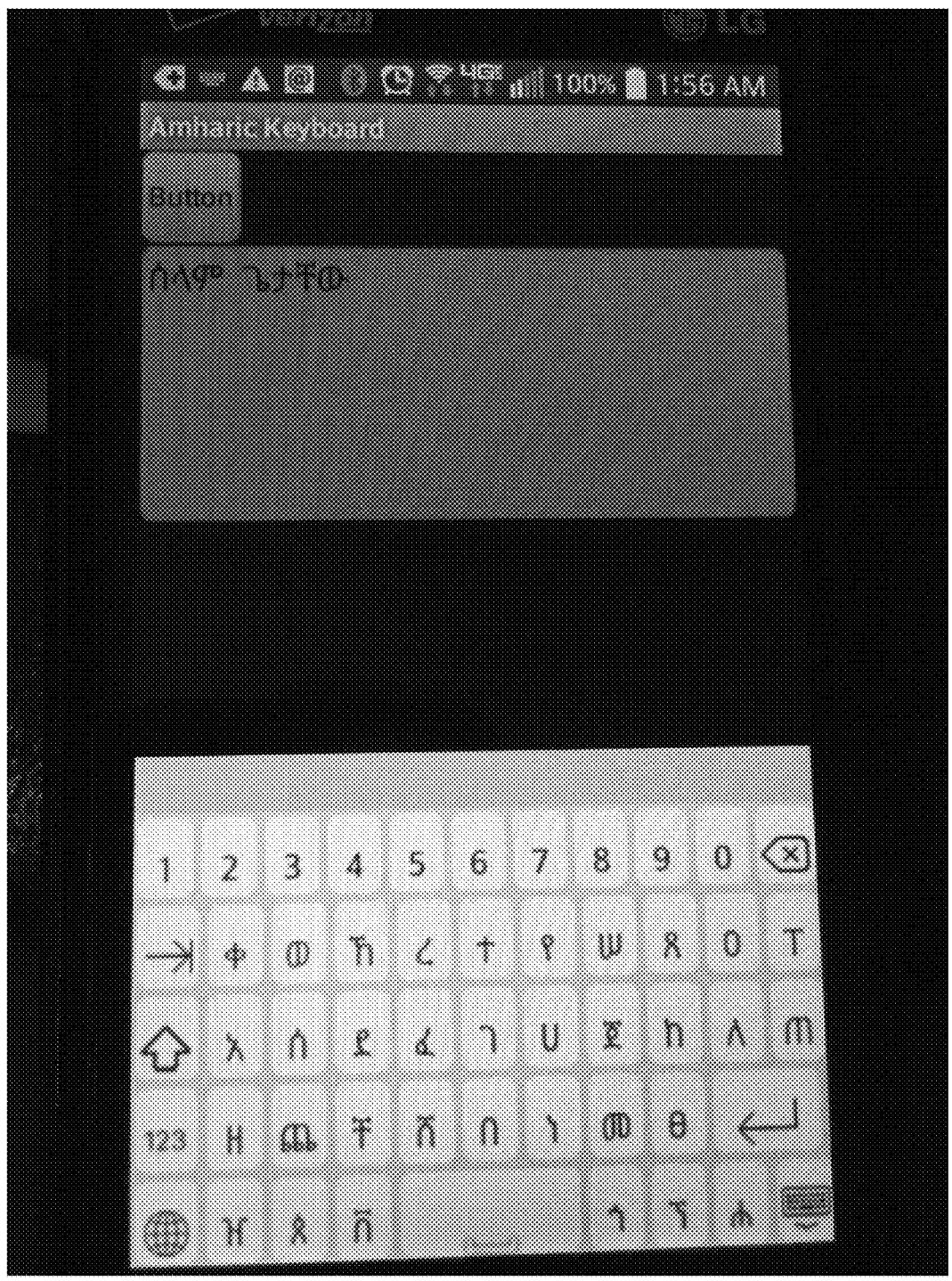
FIG. 26 illustrates a default Android keyboard on rows with 11 keys.

FIG. 2 illustrates a virtual keyboard, in this embodiment, for an iPhone® 6. FIG. 3 illustrates an example of a default Ethiopic keyboard on an iPhone® 6. FIGS. 4 and 5 illustrates a default virtual QWERTY Ethiopic keyboard showing the vowels associated with numbers. FIG. 6 illustrates Ethiopic on a 14 key keyboard. FIG. 7 illustrates shifted glyphs rendered by tapping the shift button only. FIG. 8 illustrates a 14 key keyboard with numbers. FIG. 9 illustrates an Ethiopic keyboard with a language button ("ᐃᕿᐃ" button) which allows the rendering of the Ethiopic numeric and alphabetic numbers. FIG. 10 provides an Amharic 14 key keyboard showing one set of vowel keys. FIG. 11 illustrates Amharic on a virtual keyboard showing sets of vowels and dead keys. FIG. 12 illustrates an Ethiopic 14 key keyboard illustrating vowels on a $6^{th}$ row. FIG. 13 illustrates the Guragie language example vowel glyphs on a keyboard. FIG. 14 illustrates an embodiment of the Ethiopic showing glyphs sharing on a default hardware keys. FIG. 15 illustrates a default keyboard with 12 keys per row. FIG. 16 illustrates Ethiopic on a 6 row keyboard. FIG. 17 illustrates Ethiopic sharing for keystrokes on a keyboard. FIG. 18 illustrates multiple language sharing on a keyboard. FIG. 19 illustrates a default keyboard with 12 keys per row. FIG. 20 illustrates a keyboard with 11 keys per row. FIG. 21 illustrates a keyboard with 12 keys per row. FIG. 22 illustrates a shifted keyboard with 12 keys per row. FIG. 22 may show the first order keys. FIG. 23 illustrates a default keyboard. FIG. 24 illustrates a second shift on a keyboard. FIG. 25 illustrates a third shift on a keyboard. FIG. 26 provides an example keyboard on an Android device. FIG. 27 illustrated glyphs available from a shift to render a vowel form. FIG. 28 illustrates example key names. FIG. 29 illustrates a comparison of keystrokes. ABASH is the method set forth in Molla. Aberra are the methods set forth in the present invention. FIG. 30 illustrates the English capital accents accessible from the shift key. FIG. 31 illustrates an Ethiopic sorting order example layout. FIG. 32 illustrates an example keyboard with dedicated vowels on a separate row. FIG. 33 illustrates a desktop keyboard utilizing the present invention.

Another embodiment is the variation that can be introduced with languages. For instance, with Amharic only 34 of the 37 default keys are utilized. As a result, the "minus", "equals" and "backslash" keys can be used as part of keys to render the five vowel forms. In the case of Ethiopic the "Slash", "Open square bracket", "Period", "Semi colon" and "Close square bracket" can be utilized. An option is the appearance of their representative in the numeric key row.

In another embodiment, the default number rows would both be Arabic while one of the shifted ones will have Ethiopic. The Ethiopic numerals would thus be rendered with the Shift while the default would be Arabic. The other numeral row would be used as dedicated vowels eliminating the limitations of mixing default glyphs followed by numerals. Example: "k1" renders "ህ 1" while "kē" renders "ህ" and "ēē" renders "ē". It is also possible to assign one of the second numbers to "ሙ" so that "ku" renders "ኩ".

Figures 34, 35:
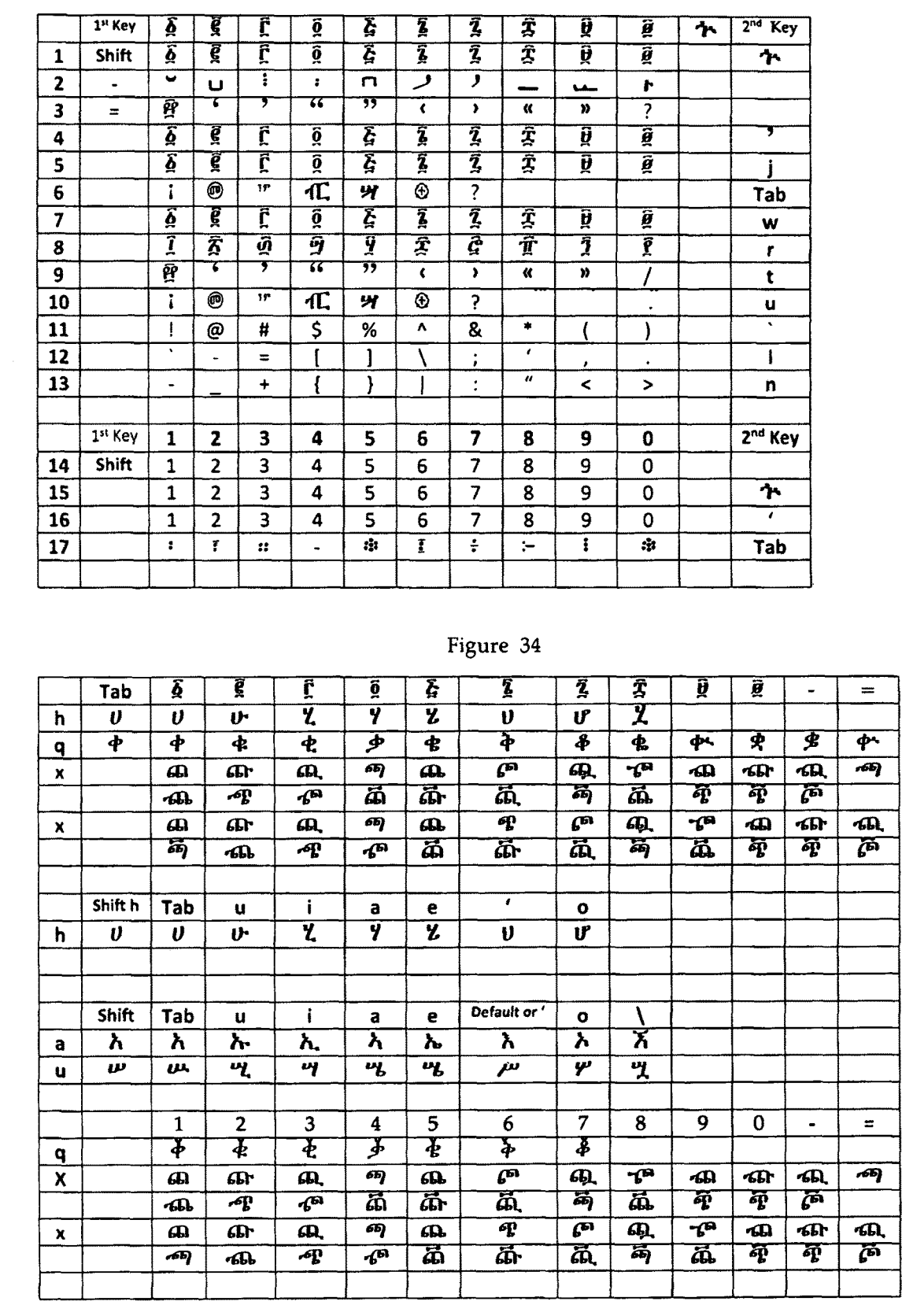

In cases where there Is shortage of keys, the sizes of those such as "Space Bar" and "Enter" can be reduced. Language glyphs will be added progressively starting out with the Geez language as the first. This is because tapping or clicking on the "q" default would force the appearance of the "q" orders in the Ethiopic numeral rows. Striking the Ethiopic number one would highlight the Ethiopic mapped to the """, "j", "Tab", "w", "r", "t", "u", "1" and "n" keys. The numbers alone are picked by striking their second keystrokes as shown in FIG. 34.

When keys such as "q", "e", "g", "k" and "x" are tapped, their vowel forms of the glyphs will appear on the number keys depending on the choice of the language. Selecting Ethiopic will render all forms. Striking the "x" key for Ethiopic use shows all the 22 choices. For someone familiar with the system even highlighting may not be necessary for Amharic as the vowels and the "Q" series are known. Striking the choices could be turned on and off with menus. Those who want to see the Ethiopic numerals could either use the highlighted and rendered vowel forms on the vowels while those who do not mind this could have the 12 on top highlighted. Amharic and Ethiopic keyboards are not necessarily the same.

Optionally zero backslash can be used for Ethiopic zero series or the notations. The major point here is to show the availability of numerous options. More rows can be added if necessary.

Another embodiment is to add keys to work as vowels other than utilizing current keys such as "Tab".

Additional option on the keyboard is the use of the shift key as in typing "ጥ" with "Shift t". It is also possible to build the English spelling type of keyboard using the current invention such that ";u" typing of "ቱ" is also rendered with "Tē". Thus another embodiment is the availability of more than one keyboarding method at the same time to compose a document. Tapping on the arrowed shift renders the Ethiopic first order characters. However the Ethiopic and Arabic numerals also render here with a keystroke each. Since third class glyphs could use the vowel, highlighting the Ethiopic numerals may not be necessary unless some keyboarding with keystrokes is brought to the second keyboard. However, highlighting can be utilized to keep Amharic on the default keyboard simple. Thus, it is possible to have a default keyboard for Ethiopic or just Amharic.

In some embodiments, the shifted keyboard glyphs there may not require one or two keystrokes to settle. For instance, as in FIGS. 17 and 18 the Ethiopic numerals cannot be settled with one keystroke alone as both the Ethiopic and Arabic numerals are also used as vowels. On the other hand the numerals on the $1^{nd}$ and $2^{rd}$ shifted keyboards when present there can be typed with a keystroke each because they may not be used as vowels. However, the numbers can be rendered with a keystroke each as the Geez glyphs on the vowels have been moved to the bottom row while the vowels are dedicated at least for Amharic (FIG. 16). The Ethiopic numeral row can accommodate glyphs with three order varieties leaving the Arabic numerals alone (FIG. 17).

Another part of the embodiment that should be understood with this point is the fact that the Ethiopic numerals with Ethiopic zero in the rows as in FIGS. 6 to 18 are working Ethiopic digits. The Ethiopic digits as in FIG. 9 without zero are the alphabetic types. The Ethiopic numerals in FIG. 6 are not alphabetic and the codes correspond to the Ethiopic Unicode ASCII of a second Ethiopic typeface. The use of the Shifted key introduces a third keystroke and this is not recommended. This is because all the 500 or so Ethiopic glyphs can be typed with one and two keystrokes from a single keyboard on varieties of abbreviated and non-abbreviated Ethiopic keyboards within limits.

The Ethiopic numerals are rendered from a second font using the Ethiopic numerals alone or in combination with other keys. Ethiopic numerals and Arabic numerals are typed with the shift key, "Minus", "w", "r", "t" or with the "Apostrophe" as a second keystrokes because the system can accommodate large numbers of choices. The Ethiopic numerals can be rendered with the "j" key second keystrokes too. Thus, when the Ethiopic 1 key is struck, one of the glyphs that would highlight is the "J" key. It is also possible for the Ethiopic digit one or "፩" from another font highlight on the "j" key. The rendering of the Ethiopic digit one or "፩" from another font with the "j" key should not be confused with the typing of the alphabetic "፩" that appears on the "w" key. It may be necessary to differentiate these with different colors or shapes. The purpose of utilizing the "j" key as opposed to the "w" key to render the Ethiopic numbers is because the numeric Ethiopic glyphs share the same codes with the Arabic numerals. While the numbers generated by "j" and "w" look the same, the one rendered by "j" are functional numbers. Because the numeric keyboard interferes with the use of the default numbers, the numbers have to use two keystrokes. The numeric keyboard on cell phones also forces the use of two keystrokes for numbers. Thus an alternative is the option to use it from a shifted keyboard which is also another two keystroke method. Since the timeout can be added to the progressive timeout, the numbers can also be rendered with only one keystroke each and this is thus an advantage. The best method of rendering the Ethiopic numeral digits may be with the Shift and numbers. Like any of the other choices available striking the Shift key optionally brings up the ten digits with or without highlighting. This option can be turned off as one can type them with one keystroke and see the glyphs and the apostrophe or another key may be needed sometimes to settle them. These descriptions are also options and all the features do not have to be available.

The Ethiopic typefaces are automatically picked up from the keyboard by the applications or the apps. Since a user often changes the typeface of a document, the two Amharic or Ethiopic fonts are similar except for the shapes of the Arabic and Ethiopic numerals. These features have to be considered when a document font is highlighted and globally altered.

Another embodiment is the use of the Shift and numbers to render numbers and this novel approach to take advantage of the use of only one keyboard for Ethiopic. The Ethiopic period that is rendered from "Shift 3" is also available through "3 Tilde". Thus when the Shift key is taped the numeric keys may highlight to pick the Arabic and Ethiopic numerals. One of these two can be utilized for some other keyboarding.

The numeric keyboard on smaller cell phones also forces the use of two keystrokes for numbers. Thus an alternative is the option to use it from a shifted keyboard which is also another two keystroke method and is an advantage as it does not requires a third keystroke to return to the default page. Since the timeout can be added to the progressive timeout, the numbers can also be rendered with only one keystroke each and this is thus an advantage available for the user to utilize.

Autocorrecting an undocumented word with an undocumented autocorrecting word results in an undocumented word. The invention allows autocorrection of words as they are scientifically rendered. Since autocorrect completes partially rendered glyph, the ABSHA/Aberra systems will allow completion of words.

With autocorrect words such as "ቅኝ" appear in a list to be selected so that it is not necessary to type it out.

The phantom methods convert documents to more phantom varieties and the accuracy of autocorrect is doubtful as an autocorrected word may not be accurate.

Examples of virtual keyboards for iPhone® 6 is FIG. 3 and FIG. 4 is for iPhone® 6S and they represent smart gadgets like iPad, tablets and virtual computer keyboards. Another embodiment of the current method is the maintenance of the rendering of the Ethiopic from a single keyboard. (FIG. 5) In gadgets such as iPad the full QWERTY Amharic and English keyboards are available.

In the Ethiopic set the BS row shows the $22^{nd}$ vowels (FIGS. 6 and 7). FIG. 35 is to show the typing of those with three varieties like the "ቧ" and "ኸ" series.

Another embodiment to improve on the typing is to use the shifted keyboard for some Ethiopic glyphs. Examples are in FIG. 7.

When the Shift key is pressed, either only the key highlights or the first order glyphs of the characters along with the glyphs under the keys show up. These are subject to modifications as it may not be essential to show them all.

FIG. 8 is an example of third Shift or "123" button to render numbers and symbols.

FIG. 9 is an example of a second Shift or "−+?" button to render symbols and Ethiopic numeric and alphabetic numbers. A third key may also substitute the Tab, shift, Mic, or an additional key (FIG. 4) as those like the mic and "Remove Keyboard" keys can also be moved to the shifted positions, if necessary as in the default varieties of FIG. 7.

Another embodiment is the use of the abbreviated or non-abbreviated keys with numerous modifications. This can be left to the user to select through menus.

Another embodiment is the utilization of the Shift key to render some orders for those who are used to it. In reality this is an unnecessary keyboard. Thus "Shift t" would highlight the "ጠ" varieties on the numbers and/or vowels. This includes glyphs on shifted keyboards.

Another embodiment is that languages will be separated with menu as well as keyboard varieties. This is important to separate spell checkers, thesaurus, speech recognition, optical character recognition and the like into languages to avoid complications. Ethiopic speech should be simpler than English as there is less spelling issue to deal with in association of glyphs and sounds.

Another embodiment is to give the namesake characters their own keys at the bottom This is helpful especially to limit the number of rows to five as in the Amharic keyboard and in maintenance of the vowel and symbol keyboards. This eliminates the arbitrary use of the Mokshe or the so-called redundant series, though the major advantage is for the newer character sets and not Amharic.

Another embodiment involves the optional shifted keyboards. These keyboards are needed to make it simple for users who may not want to be bothered by the combination keystrokes. As a result the user can go to the shifted keyboards from a default keyboard with or without the language selection. In a complete set as shown in FIGS. 5 and 6 those glyphs available in the shifted positions can be removed from the default positions and the Function key row (FIG. 6) could substitute a row even in laptops.

In another embodiment the redundant glyphs are presented at the bottom row of the keyboard. This separates the function of the vowel keys as vowels from the glyphs introducing the use of the vowel keys for rendering glyphs. Thus "ka" types the 4th vowel form of "k". The function of the 'a' key is similar to the "4" key (FIG. 13). Note that there are at times when two "a" keys are utilized to enhance this feature optionally.

In another approach for Amharic typing a phantom row appear on or above the number keys with 12 varieties and disappear after one is picked. With Ethiopic two rows appear and "che" series needs 22 to highlight and two rows are enough. Thus five rows are sufficient and the top rows will revert to numerals after the glyph is picked. These also applies to "dhe" and the rest especially if the Oromiffa glyph is to lose the minus key.

This approach lends itself to varieties of modifications even for the English as well as shifted keyboards (FIG. 30). It is now possible to utilize the Ethiopic method for English and related glyphs so that each is typed with no more than two keystrokes. This includes glyphs such as copyright and Euro symbols. It also improves on past errors. For instance many are assuming that the "ቀ" and "ቐ" are related and were assigned to the "q" key.

A new optional feature is the addition of a language key, illustrated as "፩፪" or labeled key to the default and first shifted keyboards. The "፩፪" key on the default keyboard key is to bypass the second shifted keyboard and go to the third shifted keyboard. It is there on the default and other keyboards to get there directly with only one tap. The system is efficient in that a 4$^{th}$ keyboard is not necessary. All the Ethiopic glyphs can also be rendered with one and two keystrokes each from a default keyboard. Dr. Molla has also adopted the symbol keys of computers as Ethiopic. Further details have been left out as the purpose of this document is methods of efficiently rendering of Ethiopic and other relevant languages. There are excellent feature in the commercial version of GeezEdit for Windows (XP to 10) and the App (iOS8 to 9) that can be used for the new system. However, the method of rendering glyphs in abbreviated and non-abbreviated keyboards can also be utilized for English and related alphabets eliminating toggling through keystrokes to access symbols such as the Euro in English cell phones. Thus FIGS. 22 to 25 are to show the mapping only as there is no need to toggle through the keyboards (FIG. 23) as they are accessed through the "123", "!@#" and other keys from the default and rendered with two keystrokes each.

Numerous features and methods Ethiopic need can be incorporated in the virtual as well as the hardware versions of the keyboards. This is because Ethiopic is virtually an expanded version of the English system with more glyphs. Since Ethiopic is a phonetic alphabet with a glyph representing each potential sound, its conversion to represent sound is simpler and clearer than English. The potential sound varieties are less than 500. Methods created for English, such as optical character recognition (OCR), speech recognition, text to speech, speech to text, autocorrect for various Ethiopic-user languages, spell checkers, grammar corrections, indexing, etc. can be adapted to Ethiopic. Some features like on screen word translation and collection of words for spelling and autocorrect has already been part of the Windows version of EthioSuite and this can be incorporated to computers and the virtual keyboard environments.

Ethiopic is phonetic syllable and it can thus be a reference for other alphabets or it can work in the background. It is an excellent alphabet since each glyph represents sound and the pattern can be extended to some other languages. An Amharic user can select the complete or reduced Amharic character set optionally.

In another embodiment varieties with three vowel forms can be distributed on a shifted keyboard and rendered from there with the numbers or vowels especially when 14 keys are not available in a row as in FIG. 6. This is because small keyboards can be compensated with more rows.

As shown in FIGS. 17 to 21, it is possible to use different configurations and fit the Ethiopic on a single keyboard with 12 or more keys in a row and on many columns.

Actually the system can be used to improve the English and other accented glyphs. Two numeric rows could be utilized to accommodate both vowel cases or one could be enough if the Shift is to be used for the capitals. An option is to perform these activities on the shifted keyboards. Thus striking the "a" key would bring up the ten accented forms of the "a" on the top row or somewhere to be picked up with a keystroke each. (FIG. 30) In cases such as Spanish the accented "n" would use the method.

An aspect of the invention is a method to type a phonetic character using a timer, wherein the timer is greater than 0 seconds. When a timer approaches 0 seconds, it is near impossible for a user to enter a first keystroke and a second keystroke in a timely manner to provide a second character, similar to the method explained in Molla. The present invention solves this problem by starting with a timer greater than 0. By way of example, if a "k" is typed, then the first character is rendered. If a timeout is large, for example 10 minutes, or one hour, then if a second keystroke is entered within the timer, and is modifying keystroke, then the first character is removed and a second character is rendered and settled. In other embodiments, a disable key could be used. Thus, when a first keystroke is entered, a first character is rendered and is settled by a settling keystroke (by way of example, an apostrophe or a comma) if the settling keystroke is entered within the timer. Then if a user enters a modifying key, the first character remains displayed and does not change to a second character.

The present invention is also applicable for ligating a character (i.e. adding marks to change the character).

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method to render a phonetic character on a display screen, comprising:
   providing a first keystroke input on a keyboard, wherein said first keystroke input comprises a single key input or a shift key input and said single key input;
   rendering a first phonetic character on a display screen exclusively associated with said first keystroke input, wherein said first phonetic character is settled such that said first phonetic character cannot be modified to represent a different phonetic character unless a modifier keystroke input on said keyboard is provided;
   providing a second keystroke input on said keyboard;
   determining if said second keystroke input is said modifier keystroke input; and
   modifying said first, phonetic character rendered on said display screen to represent a second phonetic character when said second keystroke input is determined to be said modifier keystroke input wherein said second phonetic character is different than said first phonetic character, said second phonetic character is exclusively associated with said first keystroke input and said second keystroke input, and said second phonetic character is settled such that said second phonetic character cannot be modified to represent a different phonetic character; and rendering a third phonetic character on said display screen adjacent said first phonetic character when said second keystroke input is determined to not be said modifier keystroke input, wherein said third phonetic character is exclusively associated with said second keystroke input.

2. The method of claim 1, wherein said modifier keystroke input is a keystroke associated with any available key on said keyboard.

3. The method of claim 1, wherein said phonetic character is Ethiopic.

4. The method of claim 1, wherein said keyboard is associated with a device, including one of a phone, tablet, or a desktop computer.

5. The method of claim 1, wherein at least one of said first phonetic character, said second phonetic character, or third phonetic character can be optionally settled based on an expiration of a programmable progressive timer.

6. A keyboard for typing an Ethiopic character, comprising:

a keyboard comprising between 11-16 character keys per row, and between 5-7 rows;

a computing device associated with said keyboard that renders Ethiopic characters on a display screen based on inputs from said keyboard;

a first keystroke input comprising a single key input or a shift key input, wherein when said first keystroke input is provided to said keyboard, a first Ethiopic character is rendered on said display screen exclusively associated with said first keystroke input, and said first Ethiopic character is settled such that said first Ethiopic character cannot be modified to represent a different Ethiopic character unless a modifier keystroke input is provided to said keyboard; and a second keystroke input, wherein when said second keystroke input is provided to said keyboard, determining if said second keystroke input is said modifier keystroke input, and modifying said first Ethiopic character rendered on said display screen to represent a second Ethiopic character when said second keystroke input is determined to be said modifier keystroke input, said second Ethiopic character is different than said first Ethiopic character and said second Ethiopic character is exclusively associated with said first keystroke input and said second keystroke input, and said second Ethiopic character is settled such that said second Ethiopic character cannot be modified to represent a different Ethiopic character; and rendering a third Ethiopic character on said display screen, adjacent said first Ethiopic character when said second keystroke input is determined to not be said modifier keystroke input, and said third Ethiopic character is exclusively associated with said second keystroke input.

7. The keyboard of claim 6, wherein said modifier keystroke input is a keystroke associated with any available key on said keyboard.

8. The keyboard of claim 6, further comprising a programmable progressive timer, wherein at least one of said first phonetic character, said second phonetic character, or third phonetic character can be optionally settled based on an expiration said programmable progressive timer.

9. The keyboard of claim 6, wherein the computing device is a phone, a tablet or a desktop computer.

10. The keyboard of claim 6, wherein a row of said character keys is dedicated to said modifier keystroke inputs.

11. The keyboard of claim 6, further comprising a language key to set a default language.

* * * * *